United States Patent [19]

Huang

[11] Patent Number: 5,269,688
[45] Date of Patent: Dec. 14, 1993

[54] TRANSMISSION AND READING GUIDE RAPID RETURN DEVICE FOR AN AUXILIARY READING APPARATUS

[76] Inventor: San Y. Huang, 1F, No. 10, Lane 56, Shih Jian Street, Pei Tou Taipei, Taiwan

[21] Appl. No.: 59,634
[22] Filed: May 10, 1993
[51] Int. Cl.⁵ ............................................. G09B 17/04
[52] U.S. Cl. ............................................. 434/179; 434/178
[58] Field of Search ............... 434/182, 183, 181, 177, 434/178

[56] References Cited

U.S. PATENT DOCUMENTS

| | | |
|---|---|---|
| 3,262,219 | 7/1966 | Bristol ................................. 434/183 |
| 3,698,103 | 10/1972 | Harmon ................................ 434/183 |
| 4,880,385 | 11/1989 | Huang ................................ 434/181 |

Primary Examiner—John J. Wilson
Assistant Examiner—Jeffrey A. Smith
Attorney, Agent, or Firm—Bucknam and Archer

[57] ABSTRACT

A transmission and reading guide rapid return device for an auxiliary reading apparatus which includes a driving wheel driven by a DC motor through a transmission gear unit to move a reading guide in either direction alternatively, a switch, and a control bar driven by the reading guide to switch the switch between the forward position and the return position. The revolving speed of the DC motor is regulated by changing the voltage to the DC motor.

3 Claims, 2 Drawing Sheets

TRANSMISSION AND READING GUIDE RAPID RETURN DEVICE FOR AN AUXILIARY READING APPARATUS

BACKGROUND OF THE INVENTION

The present invention relates to auxiliary reading apparatus used to help people read rapidly, and more specifically the present invention relates to a transmission and reading guide rapid return device for an auxiliary reading apparatus.

Various auxiliary reading apparatus have been disclosed, and have appeared on the market. A normal reading apparatus generally comprises a reading guide driven from one side to the other at a constant speed. Each time the reading guide reaches the finish side, power supply must be switched off so that the reading guide is moved back to the start side again with the hand. This reading guide manual return operation is complicated and time consuming. In order to eliminate the drawbacks of the conventional auxiliary reading apparatus, the present inventor invented an auxiliary reading apparatus with a reading guide automatic return control which automatically moves the reading guide to the start side each time it reaches the finish side. This design eliminates the process of repeatedly moving the reading guide back to the start side. However, this design still has a drawback. Because the return speed of the reading guide is equal to its forward speed, much time is wasted in moving the reading guide back to the start side.

SUMMARY OF THE INVENTION

The present invention has been accomplished under the aforesaid circumstances. It is therefore the primary object of the present invention to provide a transmission and reading guide rapid return device which automatically moves the reading guide back to the start side at a high speed each time the reading guide reaches the finish side.

DETAILED DESCRIPTION OF THE PREFERRED EMBODIMENT

Figure 1:
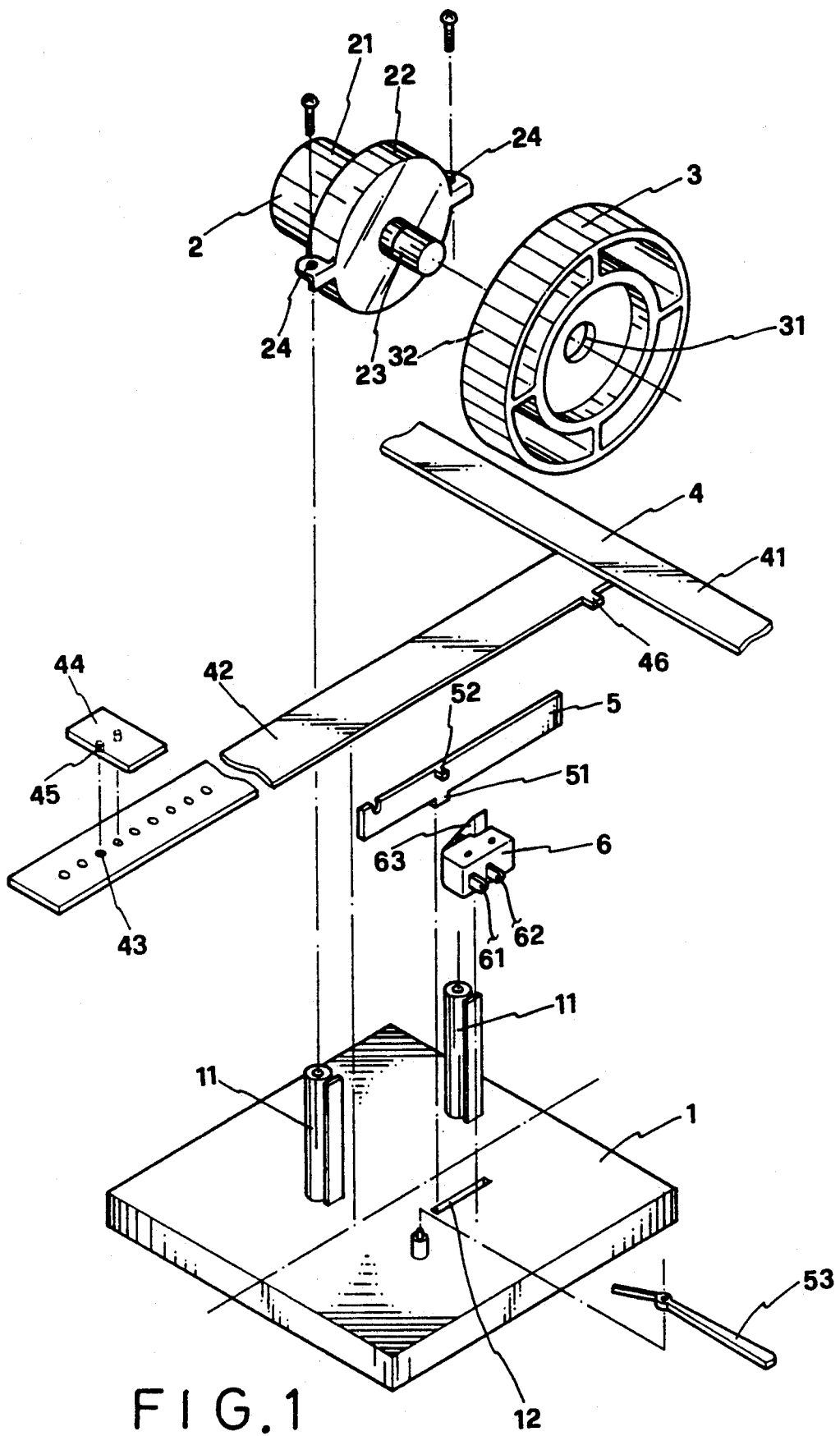
FIG. 1 is a perspective exploded view of the preferred embodiment of the present invention.
Figure 2:
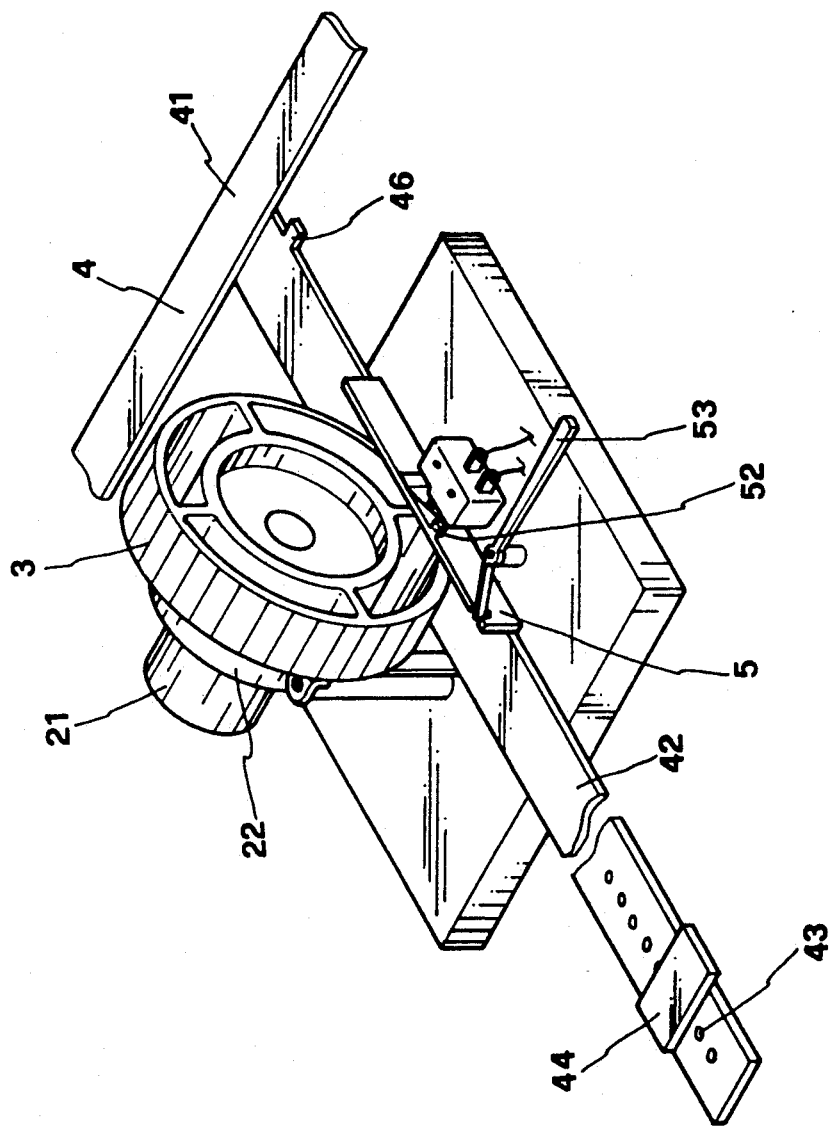
FIG. 2 is a perspective elevational view thereof.

Referring to FIGS. 1 and 2, the present invention is generally comprised of a base 1, a motor drive 2, a driving wheel 3, a reading guide 4, a control bar 5, and a switch 6.

The base 1 is a platform for supporting the aforesaid other parts, having two upright posts 11 for mounting the motor drive 2, and a sliding slot 12 for sliding the control bar 5.

The motor drive 2 comprises a DC motor 21, a transmission gear unit 22, and a transmission shaft 23 coupled to the DC motor 21 through the transmission gear unit 22. The casing of the transmission gear unit 22 has two mounting tabs 24 respectively fixed to the two upright posts 11 of the base 1 at the top. Because the transmission shaft 23 is driven by the DC motor 21 through the transmission gear unit 22, the revolving speed of the transmission shaft 23 can be adjusted by changing the voltage to the DC motor 21. The transmission gear unit 22 reduces the revolving speed of the output of the DC motor 21 and simultaneously increases its torsional force.

The driving wheel 3 is a round wheel, having a center hole 31 fixed to the transmission shaft 23 and parallel grooves 32 transversely spaced around the periphery to increase the friction force between said reading guide and said driving wheel.

The reading guide 4 is a T-bar, having a transverse scanning bar 41 perpendicularly connected to a longitudinal bar 42. The longitudinal bar 42 has a series of pin holes 43 near a rear end thereof for mounting a stop plate 44. The stop plate 44 has bottom pins 45 alternatively inserted in the pin holes 43. The longitudinal bar 42 further has a projecting rod 46 near the transverse scanning bar 41 for stopping the control bar 5.

The control bar 5 is made from a narrow, elongated, flat plate, having a vertical bottom rod 51 made to slide in the sliding slot 12 on the base 1, and a horizontal top rod 52 moved to switching the switch 6. A hand lever 53 is coupled to the rear end of the control bar 5 for driving the control bar 5 to switch the switch 6 manually. This hand lever 53 allows the user to return the reading guide 4 during its forward stroke.

The switch 6 is a microswitch, having a forward contact 61 and a return contact 62 alternatively connected by a switching lever 63. As the switching lever 63 is connected to the forward contact 61, the driving wheel 3 is caused to rotate counter-clockwise, and therefore the reading guide 4 is moved forwards. As the switching lever 63 is connected to the return contact 62, the voltage is turned to the predetermined highest voltage, and the driving wheel 3 is caused to rotate clockwise at a high speed in moving the reading guide 4 back to its former position rapidly.

Referring to FIG. 2 again, as the motor drive 2 is turned on to rotate the driving wheel 3, the reading guide 4 is carried to move the scanning bar 41 from line to line to help reading. As soon as the stop plate 44 reaches the control bar 5, the control bar 5 is immediately carried forwards, causing the vertical bottom rod 52 to slide in the sliding slot 12. As the horizontal top rod 52 of the control bar 5 passes through the switching lever 63, the switching lever 63 is moved from the forward contact 61 to the return contact 62, thereby causing the DC motor 21 to change its revolving direction in returning the reading guide back to its former position rapidly. When returned, the control bar 5 is also moved back to its former position by the projecting rod 46. As the control bar 5 is returned, the switching lever 63 is moved from the return contact 62 to the forward contact 61 by the top horizontal rod 52, causing the DC motor 21 to change its revolving direction again, and therefore the reading guide 4 is moved forwards again. The aforesaid procedure is repeated again and again. During the reading operation, the user can turn the pages upon a return stroke.

As indicated, the revolving speed of the DC motor 21 can be adjusted by changing the voltage, therefore the scanning speed of the reading guide 4 can be set as desired by regulating the voltage properly.

While only one embodiment of the present invention has been shown and described, it will be understood that various modifications and changes could be made without departing from the spirit and scope of the invention.

What is claimed is:

1. A transmission and reading guide rapid return device for an auxiliary reading apparatus, comprising:

a flat base having two upright posts and an elongated sliding slot;

a motor drive fastened to said upright posts, said motor drive comprising a DC motor, a transmission gear unit, and a transmission shaft coupled to said DC motor by said transmission gear unit, said transmission gear unit having two mounting tabs respectively fixed to said upright posts at respective top portions, the revolving speed of said DC motor being regulated by changing the voltage to said DC motor;

a driving wheel being a round wheel coupled to said transmission shaft;

a reading guide driven to move forwards and backwards by said driving wheel, said reading guide comprising a transverse scanning bar perpendicularly connected to a longitudinal bar, and a stop plate, said longitudinal bar comprising a series of pin holes near a rear end thereof spaced from said transverse scanning bar for mounting said stop plate by pins, and a projecting rod near said transverse scanning bar;

a control bar made from a narrow, elongated, flat plate, having a vertical bottom rod made to slide in said sliding slot on said base, and a horizontal top rod;

and a switch having a forward contact and a return contact alternatively connected by a switching lever to turn said DC motor in either direction, said switching lever being alternatively shafted from either contact to the other by said horizontal rod of said control bar.

2. The transmission and reading guide rapid return device of claim 1 wherein said driving wheel has parallel grooves transversely spaced around the periphery to increase the friction force between said reading guide and said driving wheel.

3. The transmission and reading guide rapid return device of claim 1 which further comprises a hand lever coupled to said control bar for driving said control bar to switch said switch manually.

* * * * *